United States Patent
Cai et al.

(10) Patent No.: US 8,352,631 B2
(45) Date of Patent: Jan. 8, 2013

(54) METHOD FOR IMPROVING TRANSMISSION EFFICIENCY OF PHYSICAL LAYER ATTRIBUTES IN WIRELESS COMMUNICATION SYSTEM

(75) Inventors: Sean Cai, San Diego, CA (US); Ling Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 619 days.

(21) Appl. No.: 12/595,948

(22) PCT Filed: Jan. 24, 2008

(86) PCT No.: PCT/CN2008/000172
§ 371 (c)(1),
(2), (4) Date: Oct. 14, 2009

(87) PCT Pub. No.: WO2008/124991
PCT Pub. Date: Oct. 23, 2008

(65) Prior Publication Data
US 2010/0115124 A1    May 6, 2010

(30) Foreign Application Priority Data
Apr. 16, 2007  (CN) .......................... 2007 1 0100711

(51) Int. Cl.
*G06F 15/16* (2006.01)
*H04B 7/00* (2006.01)
*H04B 3/36* (2006.01)
*H04L 27/00* (2006.01)

(52) U.S. Cl. ............... 709/236; 455/7; 455/69; 375/259
(58) Field of Classification Search .................... 709/236
See application file for complete search history.

(56) References Cited

U.S. PATENT DOCUMENTS

| 5,812,768 A | * | 9/1998 | Page et al. ............. 709/228 |
| 6,091,717 A | | 7/2000 | Honkasalo et al. |
| 6,094,426 A | | 7/2000 | Honkasalo et al. |

(Continued)

FOREIGN PATENT DOCUMENTS

CN      1199298 A      11/1998
(Continued)

OTHER PUBLICATIONS

"Efficient transmission of DCD and UCD message" IEEE 802.16 Broadband Wireless Access Working Group, Nov. 18, 2004, IEEE802.16maint-04/71r3.*

(Continued)

*Primary Examiner* — Mark Rinehart
*Assistant Examiner* — Kenneth P Hunt
(74) *Attorney, Agent, or Firm* — Woodcock Washburn LLP (57) ABSTRACT

A method for improving transmission efficiency of physical layer attributes in a wireless communication system is proposed, and the method comprises the following steps of: (a) defining one or more sets of physical layer channel basic attributes that must be supported, and each set being respectively represented by a value of a domain of attributes, that is, a value of Profile; (b) a transmitting apparatus sending a physical layer channel description information, wherein the value of Profile is used to represent the physical layer channel basic attributes supported by the apparatus; (c) after receiving the channel description information, based on the value of Profile within the information, a receiving apparatus judging whether a set of physical layer channel basic attributes corresponding to the value is supported.

22 Claims, 1 Drawing Sheet

U.S. PATENT DOCUMENTS

| | | | |
|---|---|---|---|
| 6,584,089 B1 | 6/2003 | Honkasalo et al. | |
| 7,065,059 B1 * | 6/2006 | Zinin | 370/312 |
| 7,376,101 B2 * | 5/2008 | Shim et al. | 370/331 |
| 2002/0115421 A1 * | 8/2002 | Shahar et al. | 455/403 |
| 2004/0062262 A1 * | 4/2004 | Venteicher et al. | 370/431 |
| 2004/0166857 A1 * | 8/2004 | Shim et al. | 455/436 |
| 2006/0030322 A1 * | 2/2006 | Kim et al. | 455/436 |
| 2006/0094436 A1 * | 5/2006 | Kim et al. | 455/450 |
| 2006/0099946 A1 | 5/2006 | Burgess et al. | |
| 2007/0010267 A1 * | 1/2007 | Son et al. | 455/502 |
| 2007/0076684 A1 * | 4/2007 | Lee et al. | 370/350 |
| 2007/0124439 A1 * | 5/2007 | Shah et al. | 709/223 |
| 2008/0016350 A1 * | 1/2008 | Braskich et al. | 713/169 |
| 2008/0219198 A1 | 9/2008 | Honkasalo et al. | |
| 2011/0044238 A1 * | 2/2011 | Shi et al. | 370/328 |

FOREIGN PATENT DOCUMENTS

| | | |
|---|---|---|
| JP | 2007068092 A | 3/2007 |
| WO | WO 2006/049458 A1 | 5/2006 |
| WO | WO 2006/049460 A1 | 5/2006 |
| WO | WO 2007/004850 A1 | 1/2007 |
| WO | WO 2007/015829 A2 | 2/2007 |
| WO | WO 2008/124991 | 10/2008 |

OTHER PUBLICATIONS

"The unified TLV encoding for DCD and UCD in OFDMA PHY mode" IEEE 802.16 Broadband Wireless Access Working Group, Nov. 3, 2004, IEEE C802.16e-04/440.*

"PHY Profile ID" IEEE 802.16 Broadband Wireless Access Working Group, IEEE 802.16 Broadband Wireless Access Working Group, Aug. 31 2004, IEEE C802.16e-04/320r4.*

IEEE Std 802.16e-2005 IEEE Std 802.16-2004/Cor 1-2005 (LAN/MAN Standards Committee) Feb. 28, 2006 p. 47, 6.3.2.3.1, p. 672 to p. 675.

* cited by examiner

METHOD FOR IMPROVING TRANSMISSION EFFICIENCY OF PHYSICAL LAYER ATTRIBUTES IN WIRELESS COMMUNICATION SYSTEM

TECHNICAL FIELD

The present invention relates to a method for improving the transmission efficiency of air link in a wireless communication system, and more specifically, to a method for improving the transmission efficiency of air interface broadcasting messages in the physical layer.

BACKGROUND OF THE INVENTION

Nowadays, there exist a variety of wireless communication systems, such as CDMA2000, WCDMA, WiMAX, Wi-Fi, and so on. A common problem that these wireless communication systems face is how to improve the transmission efficiency of the air interface. Therefore, in the physical layer (PHY) and layer 2 (such as MAC in LTE, MAC in UMB, MAC in WiMAX system, and MAC layer in Wi-Fi), how to obtain higher transmission efficiency with limited spectrum bandwidth and limited wireless resources is being considered.

The issue mainly considered in this specification is the design for the message format of layer 2.

Take IEEE802.16e-2005 for example, in which, at present, the message structure of DCD (Downlink Channel Description) supporting OFDMA is as follows:

| Syntax | Size | Comments |
|---|---|---|
| DCD_Message_Format( ) { | | |
| Management Message Type = 1 | 8 bits | |
| Reserved | 8 bits | Shall be set to zero |
| Configuration Change Count | 8 bits | |
| TLV Encoded information for the overall channel | Variable length | TLV (Type-Length-Value) format |
| Begin PHY Specific Section { for (i = 1; i <= n; i++) { Downlink_Burst_Profile } } } | | See applicable PHY chapters |

Wherein, the content of the domain TLV Encoded information for the overall channel is defined as follows:

| Name | Type (1 byte) | Length | Value (Variable length) | PHY scope |
|---|---|---|---|---|
| Downlink_Burst_Profile | 1 | | May appear more than once (see 7.1.2.3.1). Length is the number of bytes of all the objects, including the embedded TLV items. | All |
| BS EIRP | 2 | 2 | Signed, in units of 1 dBM | All |
| Frame duration | 3 | 4 | The number of PSs contained in a Burst FDD or TDD frame. Required only for framed downlinks. | SC |
| PHY type | 4 | 1 | The PHY type to be used | SC |
| Power adjustment rule | 5 | 1 | 0 = Preserve peak power 1 = Preserve Mean Power Describes the power adjustment rule when performing a transition from one burst profile to another | SC, SCa |
| Channel Nr | 6 | 1 | Downlink channel number as defined in 802.16-2004 8.5. Used for license-exempt operation only. | SCa, OFDM, OFDMA |
| TTG | 7 | 1 | TTG (in units of PS). Only used in TDD systems | SCa, OFDMA |
| RTG | 8 | 1 | RTG (in units of PS) Only used in TDD system | SCa, OFDMA |
| EIRxPIR, max | 9 | 2 | Maximum isotropic received power of Initial Ranging at BS. Signed, in units of 1 dBm | All |
| Channel Switch Frame Number | 10 | 3 | Channel switch frame number as defined in 802.16-2004.8.5. Used for license-exempt operation only. | SCa, OFDM, OFDMA |
| Frequency | 12 | 4 | Downlink central frequency (kHz) | All |
| BSID | 13 | 6 | BSID | SCa, OFDM, OFDMA |
| Frame Duration Code | 14 | 1 | The duration of the frame. | OFDM |
| Frame Number | 15 | 3 | The number of the frame containing the DCD message. If the DCD is fragmented, this parameter is the frame number of the last fragment of the DCD message. | OFDM |
| H-ARQ ACK delay for UL burst | 17 | 1 | 1 = 1 frame offset 2 = 2 frame offset 3 = 3 frame offset | OFDMA |
| Permutation type for broadcast region in HARQ zone | 19 | 1 | 0 = PUSC 1 = FUSC 2 = optional FUSC 3 = AMC | OFDMA |

-continued

| Name | Type (1 byte) | Length | Value (Variable length) | PHY scope |
|---|---|---|---|---|
| Maximum retransmission | 20 | 1 | Maximum number of retransmission in DL HARQ. Default value shall be 4 retransmissions. | OFDMA |
| Default RSSI and CINR averaging parameter | 21 | 1 | Bit#0-3: Default averaging parameter avg for physical CINR measurements, in multiples of 1/16 (range [1/16, 16/16], 0x0 for 1/16, 0Xf for 16/16). Bit #4/7: RSSI measurements multiple (range [1/16, 16/16], default value is default averaging parameter avg for 0x3, 1/16 of 1/16, 0xF for 16/16).. | OFDMA |
| Downlink AMC allocated physical bands bitmap | 22 | 6 | A bitmap describing the physical bands is allocated to the segment in downlink, when allocating AMC subchannels through the HARQ MAP, or through the Normal MAP, or for Band-AMC CINR reports, or using the optional AMC permutation. The LSB of the first byte shall correspond to band 0. For any bit that is not set, the corresponding band shall not be used by the SS on that segment. When this TLV value is not present, BS may allocate any physical bands to a SS. | OFDMA |
| Downlink region definition | 34 | variable | Num_region (6 bits for the number of regions, 2 bit reserved) For (i = 0, i < Num_region; i ++){ OFDMA symbol offset (8 bits) Subchannel offset (6 bits) Number of OFDMA symbols (8 bits) Number of subchannels (6 bits) } Padding bits | |
| Handoff type supported | 50 | 1 | Bit 0: HO Bit 1: MDHO Bit 2: FBSS HO Bit 3-7: Reserved | OFDMA |
| H_Add Threshold | 31 | 1 | Threshold used by the MS to add a neighbor BS to the diversity set. When the CINR of a neighbor BS is higher than H_Add, the MS should send MOB_MSHO-REQ to request adding this neighbor BS to the diversity set. This threshold is used for the MS to perform MDHO/FBSS HO. This value is in the unit of dB. If the BS does not support FBSS HO/MDHO, this value is not set. | OFDMA |
| H_Delete Threshold | 32 | 1 | Used by the MS to delete a BS from the diversity set. When the CINR of a BS is lower than H_Delete, the MS should send MOB_MSHO-REQ to request deleting this BS from the diversity set. This threshold is used for the MS to perform MDHO/FBSS HO. This value is in the unit of dB. If the BS does not support FBSS HO/MDHO, this value is not set. | OFDMA |
| ASR (Anchor Switch Report) Slot Length (M) and Switching Period (L) | 33 | 1 | Bit #0-#3: M, in units of frames Bit #4-#7: L, in units of ASR slots | OFDMA |
| Paging Group ID | 35 | 2 | One or more logical affiliation grouping of BS | |
| TUSC1 permutation active subchannels bitmap | 36 | 9 | When using the TUSC1 permutation, this bitmap describes the subchannels allocated to the segment in downlink. The LSB of the first byte shall correspond to subchannel 0. For any bit that is not set, the MS on that segment shall not use the corresponding subchannel. The active subchannels are renumbered consecutively starting from 0. | |
| TUSC2 permutation active subchannels bitmap | 37 | 13 | When using the TUSC2 permutation, this bitmap describes the subchannels allocated to the segment in downlink. The LSB of the first byte shall correspond to subchannel 0. For any bit that is not set, the MS on that segment shall not use the corresponding subchannel. The active subchannels are renumbered consecutively starting from 0. | |

-continued

| Name | Type (1 byte) | Length | Value (Variable length) | PHY scope |
|---|---|---|---|---|
| Hysteresis margin | 51 | 1 | Hysteresis margin is used by the MS to include a neighbor BS to a list of possible target BSs. When the CINR of a neighbor BS is larger than the sum of the CINR of the current serving BS and the hysteresis margin for the time-to-trigger duration, the neighbor BS is included in the list of possible target BSs through MOB_MSHO_REQ message. This value is in the unit of dB and applies to HHO. | All |
| Time-to-Trigger duration | 52 | 1 | Time-to-Trigger duration is the time duration for MS decides to select a neighbor BS as a possible target BS. This value is the unit of ms and only applies to HHO | All |
| Trigger | 54 | Variable length | The Trigger is a compound TLV value that indicates the triggering mechanism. The trigger with this encoding is defined for serving BS or commonly applied neighbor BSs | |
| N + I | 60 | 1 | The operator shall calculate and define the N + I (Noise + Interference) based on the corresponding RF system design | OFDM |
| Downlink_burst_profile for multiple FEC types | 153 | 1 | May appear more than once (see 7.1.2.3.1). This length is the number of bytes in all objects, including embedded TLV items | OFDMA |
| Restart Count | 154 | 1 | This value shall be increased by 1 whenever BS restarts. This value increases from 0 to 255 | All |
| MAC Version | 148 | 1 | See 8.1.3.2 | All |

It can be seen that each of the above information units is constructed with the form of Type→Length→Value, that is to say, in order to carry a information unit, firstly, a byte should be used to describe the type of the information unit (Type), then a description of the length of the unit (Length), and the next is the genuine content of the information unit (Value).

This message is periodically broadcasted to all the terminals and wireless relay stations within the dominative region, and the terminals and wireless relay stations receive the message, identify the information within the message, and update the record of physical layer attributes. Through calculation, it can be known that the length of the message is at least 72 bytes. Some information segments in the message might be multiple, thus the length is more than 72 bytes in practical applications. According to the definition in 16e, the message is sent by broadcast, and sent at least once in every 10 s, and the 72 bytes needs to occupy at least 12 time slots, and based on a calculation under the condition that each time slot needs to occupy two symbols, one subchannel (24 data sub-carriers), and the uplink to downlink ratio is 1:1, the 72 bytes needs to be transmitted on a bandwidth of 0.41856M out of a total 10M bandwidth, that is, the message at least occupies 4.19% of the wireless resources during transmission (within 5 ms).

The message is just one of the MAC broadcast messages. According to 16e protocol, messages such as UCD, DLMAP and ULMAP are all sent by broadcast. It can be seen that these broadcast messages consume a lot of air interface wireless resources.

In other wireless systems, there are also similar broadcast messages transmitting physical-layer attributes of the channel, and this type of messages are generally periodically sent. So if the number of bytes occupied by this type of messages can be reduced, the occupancy of the wireless resources can be greatly saved.

In addition, due to the large occupancy of the wireless resources, the extension of the base station capability is almost impossible, for the reason that the capability extension needs more bytes to transmit the capability information, and if the amount of bytes occupied by such type of messages can be reduced, more capability selections can be provided under the same resource occupation, thus users can be provided with more personalized service.

SUMMARY OF THE INVENTION

The technical problem to be solved by the present invention is to provide a method for improving transmission efficiency of physical layer attributes in a wireless communication system, in order to reduce the resources occupied by physical layer channel attributes messages.

In order to solve the above technical problem, the present invention provides a method for improving transmission efficiency of physical layer attributes in a wireless communication system, comprising the following steps of:

(a) defining one or more sets of physical layer channel basic attributes, and each set being respectively represented by a value of a domain of attributes, that is, a value of Profile;

(b) a transmitting apparatus sending a physical layer channel description message, wherein the value of Profile is used to represent the physical layer channel basic attributes supported by the apparatus;

(c) after receiving said channel description message, based on the value of Profile within the message, a receiving apparatus acquiring a set of physical layer channel basic attributes supported by the transmitting apparatus.

Moreover, the above method may have the following feature:

said transmitting apparatus is a base station or wireless relay station, and said receiving apparatus is a mobile terminal or wireless relay station.

Moreover, the above method may further comprise:

in step (a), a combination of optional attribute parameters of physical layer channel being defined, and each type of combination being represented by a value of a domain of options, that is, a value of Option;

in step (b), in said channel description message, the value of Option being used to represent the optional attribute parameters of physical layer channel supported by said transmitting apparatus;

in step (c), based on the value of Option, the receiving apparatus acquiring information of the optional attribute parameters of physical layer channel supported by the transmitting apparatus.

Moreover, the above method may further comprise:

in step (a), default values of physical layer channel attribute parameters being defined;

in step (b), if actual values of the physical layer channel attribute parameters are the same as the default values, said transmitting apparatus no longer providing values of the channel attribute parameters in said channel description message;

in step (c), if the receiving apparatus does not find the values of the channel attribute parameters in said message, regarding the values of the channel attribute parameters as the default values.

Moreover, the above method may further comprise:

in step (b), in said physical layer channel description message, each of the attribute parameters supported by said transmitting apparatus whose actual values are different from the default values and the actual values thereof being represented by a type and value of the attribute, and a domain of length being added in front of a domain representing types and values of these attributes, to indicate the length of the domain representing types and values of these attributes.

Moreover, the above method may further comprise:

in step (a), a combination of physical layer channel attribute parameters whose actual values are different from the default values being defined, and each type of combination being represented by a value of a domain of parameter categories, that is, a value of ParameterClass;

in step (b), if there exist physical layer channel attribute parameters whose actual values are different from the default values, said transmitting apparatus using the value of ParameterClass to represent these physical layer channel attribute parameters in said channel description message, and behind the ParameterClass, the actual values of these physical layer channel attribute parameters being written into a domain of values, that is, Value, in a pre-determined order;

in step (c), based on values of said ParameterClass and Value, the receiving apparatus acquiring the physical layer channel attribute parameters supported by said transmitting apparatus whose actual values are different from the default values and the actual values thereof.

Moreover, the above method may further comprise:

in step (a), the basic attribute parameters and optional attribute parameters whose actual values are different from the default values being combined respectively, that is, two sets of ParameterClass and Value domains being used to respectively represent the basic attribute parameters and optional attribute parameters whose actual values are different from the default values.

Moreover, the above method may further comprise:

in step (b), if some of the physical layer channel attribute parameters supported by said transmitting apparatus have actual values different from the default values, a structure of physical layer attributes information in said channel description message comprising the following domains:

a domain of attributes, Profile, used to represent physical layer channel basic attributes supported by the transmitting apparatus;

a domain of optional items, Option, used to represent physical-layer channel optional attributes supported by the transmitting apparatus;

a domain of parameter categories, ParameterClass, used to represent channel attribute parameters supported by the transmitting apparatus whose actual values are different from the default values;

a domain of values, Value, used to represent the actual values of the channel attribute parameters whose actual values are different from the default values;

a domain of length, Length, located in front of the domain of parameter categories, ParameterClass, and the value of Length equaling the sum of the lengths of other physical layer channel attribute information domains behind the domain.

Moreover, the above method may further comprise:

in step (b), if actual values of physical layer channel attribute parameters supported by said transmitting apparatus all equal the default values, a structure of physical layer channel attributes information in said channel description message comprising the following domains:

a domain of attributes, Profile, used to represent physical layer channel basic attributes supported by the transmitting apparatus;

a domain of optional items, Option, used to represent physical layer channel optional attributes supported by the transmitting apparatus;

a domain of length, Length, located between Profile and Option or behind Option, and the value of Length equaling the sum of the lengths of other physical layer channel attribute information domains behind the domain.

Moreover, the above method may further comprise:

in step (c), the receiving apparatus parsing the physical layer channel attributes information according to the following steps of:

(c1) the receiving apparatus checking the value of the domain of attributes, and judging whether a set of corresponding physical channel basic attributes is supported, and if yes, proceeding to step (c2), otherwise proceeding to step (c6);

(c2) checking the value of the domain of optional items, and if a set of optional attribute parameters combination corresponding to the value is supported, recording the value, otherwise neglecting the value;

(c3) based on the value of the domain of length, judging whether there are domains of parameter categories and values behind, and if yes, proceeding to the next step, otherwise proceeding to step (c5);

(c4) checking the domain of parameter categories, and according to a pre-definition, obtaining the value of corresponding domain of values, while if the definition of the domain of parameter categories cannot be identified, directly discarding the value;

(c5) the receiving apparatus continuing a subsequent access, and the method ending;

(c6) the receiving apparatus exiting from current network and re-searching a new network.

Moreover, the above method may further comprise:

if said transmitting apparatus supports multiple sets of physical layer channel basic attributes, said channel description message comprising structures of multiple sets of physical layer channel attributes information;

when the receiving apparatus parses the physical layer channel attributes information, in step (c6), the receiving apparatus first judging whether there is another set of physical layer channel attributes information behind based on message length information, and if yes, processing the information with the same method, otherwise exiting from current network.

Moreover, the above method may further comprise:

said basic attributes of physical layer channel in step (a) and optional attributes of physical layer channel being specified in a same protocol version, and if protocol versions or contents of compulsory items are different, as different sets of physical layer channel basic attributes, corresponding to different values of Profile, and based on this, different values of Option being defined according to optional attribute parameters combinations therein.

Moreover, the above method may further comprise:

in step (a), based on compulsory content of System Profile Version 1.0.0, corresponding Protocol Implementation Conformance Statement Version 1.0.0 and phase two, wave 2, requirement, a set of physical layer channel basic attributes being defined, and corresponding value of Profile being set to 0x01; and/or based on compulsory content of System Profile Version 1.0.0, corresponding Protocol Implementation Conformance Statement Version 1.0.0 and phase three, wave 3, requirement, a set of physical layer channel basic attributes being defined, and corresponding value of Profile being set to 0x02.

Moreover, the above method may have the following feature:

the physical layer channel description message in step (b) is an uplink channel description message and/or downlink channel description message.

Moreover, the above method may further comprise:

in step (b), a structure of physical layer attributes information in said channel description message comprising sequentially: a domain of attributes, Profile, of 1 or 2 bytes, a domain of optional items, Option, of 1 or 2 bytes, a domain of length, Length, of 1 or 2 bytes, and if there exist attribute parameters whose actual values are different from the default values, the structure further comprising one or more sets of domain of parameter categories, ParameterClass, and domain of values, Value, with variable lengths;

or a structure of physical layer attributes information in said channel description message comprising sequentially: a domain of attributes, Profile, of 1 or 2 bytes, a domain of length, Length, of 1 or 2 bytes, a domain of optional items, Option, of 1 or 2 bytes, and if there exist attribute parameters whose actual values are different from the default values, the structure further comprising one or more sets of domain of parameter categories, ParameterClass, and domain of values, Value, with variable lengths.

Moreover, the above method may further comprise:

said transmitting apparatus storing a mapping relationship between the value of each domain in said physical layer channel attributes information structure and the corresponding attribute, said receiving apparatus storing a mapping relationship between the value of each domain in said physical layer channel attributes information structure and the corresponding attribute, or storing the information whether the attribute corresponding to the value of each domain is supported.

The present invention also provides a structure of physical layer channel attributes information in a channel description message, comprising the following domains:

a domain of attributes, Profile, used to represent physical layer channel basic attributes supported by a transmitting apparatus;

a domain of optional items, Option, used to represent physical layer channel optional attributes supported by the transmitting apparatus;

a domain of parameter categories, ParameterClass, used to represent channel attribute parameters supported by the transmitting apparatus whose actual values are different from default values;

a domain of values, Value, used to represent the actual values of the channel attribute parameters whose actual values are different from the default values;

a domain of length, Length, located in front of the domain of parameter categories, ParameterClass, and the value of Length equaling the sum of the lengths of other physical layer channel attribute information domains behind the domain.

Or the structure comprises the following domains:

a domain of attributes, Profile, used to represent physical layer channel basic attributes supported by a transmitting apparatus;

a domain of optional items, Option, used to represent physical layer channel optional attributes supported by the transmitting apparatus;

a domain of length, Length, located between Profile and Option or behind Option, and the value of Length equaling the sum of the lengths of other physical layer channel attribute information domains behind the domain.

Specifically, the structure may comprise sequentially:

a domain of attributes, Profile, of 1 or 2 bytes, a domain of optional items, Option, of 1 or 2 bytes, a domain of length, Length, of 1 or 2 bytes, and if there exist attribute parameters whose actual values are different from default values, the structure further comprising one or more sets of domain of parameter categories, ParameterClass, and domain of values, Value, with variable lengths;

or said structure of physical layer attributes information in a channel description message comprising sequentially: a domain of attributes, Profile, of 1 or 2 bytes, a domain of length, Length, of 1 or 2 bytes, a domain of optional items, Option, of 1 or 2 bytes, and if there exist attribute parameters whose actual values are different from default values, the structure further comprising one or more sets of domain of parameter categories, ParameterClass, and domain of values, Value, with variable lengths.

It can be seen that the present invention provides an entirely new method for constructing the MAC layer messages as well as the method and flow for constructing and parsing the structure of this type of messages by the base station and terminals, so that the MAC layer messages are transmitted more reasonably and effectively, the wireless resources utilization rate is greatly reduced. Compared with the prior art, under the condition of transmitting the same information content, the wireless resources occupied with the MAC method provided in the present invention is 8%~57% of that with the method defined in the present standard. With the method of the present invention, when messages similar to these need to be transmitted in air, the air resources occupancy is greatly reduced, the flexibility of the base station is enhanced, the processing by the terminals and the base station is simplified and the performance of the entire system is improved.

PREFERRED EMBODIMENTS OF THE PRESENT INVENTION

From the content of Background, it can be seen that the present physical-layer channel description message describes each attribute of the physical information in a form of information unit comprising type, length and value. This form has great flexibility because all the attributes and values thereof may be combined randomly. However, the physical-layer channel attributes supported by an actual base station and their values cannot be randomly combined.

For example, according to the requirement of the operators, WiMAX Forum defined the compulsory content of the System Profile Version 1.0.0, the corresponding PICS Version 1.0.0 and phase two, wave 2, requirement, in which an excerpt of the requirement for the DCD message is as the following table.

TABLE A.286

PDU: DCD

| Item | Capability | Reference Number of relative chapter | Status | Support |
|---|---|---|---|---|
| 1 | Management Message type = 1 | [11] and [2] 6.3.2.3.1 | M | |
| 2 | Reserved (Note) | [11] and [2] 6.3.2.3.1 | M | |
| 3 | Configuration Change count | [11] and [2] 6.3.2.3.1 Reference | M | |
| 1. | Frequency | [11] and [2] 11.4.1 | m | |
| 2. | BS Id | [11] and [2] 11.4.1 | m | |
| 3. | MAC version | [11] and [2] 11.4.1 | m | |
| 4. | BS EIRP | [ ] 4.3.2; [11] and [2] 11.4.1 | m | |
| 5. | TTG | [ ] 4.3.2; [11] and [2] 11.4.1 | m | |
| 6. | RTG | [ ] 4.3.2; [11] and [2] 11.4.1 | m | |
| 7. | EIRxPIR, max | 4.3.2; [11] and [2] 11.4.1 | m | |
| 8. | HO Type Support | 4.3.2; [11] and [2] 11.4.1 | m | |
| 9. | Paging Group ID | 4.3.2; [11] and [2] 11.4.1 | m | |
| 10. | Trigger, Compound TLV see next Trigger TLV | 4.3.2; [11] and [2] 11.4.1 | m | |
| 11. | BS Restart Count | 4.3.2; [11] and [2] 11.4.1 | m | |
| 12. | Default RSSI and CINR averaging parameter | 4.3.2; [11] and [2] 11.4.1 | m | |
| 13. | DL AMC Allocated Physical Bands Bitmap | 4.3.2; [11] and [2] 11.4.1 | m | |
| 14. | OFDMA Downlink_Burst_Profile | [11] 8.4.5.5 | m | |
| 15. | Hysteresis margin | 11.4.1 | m | |
| 16. | Time to trigger duration | 11.4.1 | M | |
| 17. | MBS zone identifier list | 11.4.1 | | IO-MBS |

Comments:

TABLE A.288

OFDMA Downlink_Burst_Profile

| Item | Capability | Reference | Status | Support |
|---|---|---|---|---|
| 1 | Type = 1 | [1] 8.4.5.5; 11.4.2 | M | |
| 2 | Length | [1] 8.4.5.5; 11.4.2 | M | |
| 3 | Reserved (Note) | [1] 8.4.5.5; 11.4.2 | M | |
| 4 | DIUC | [1] 8.4.5.5; 11.4.2 | M | |
| 5 | FEC Code Type | [1] 11.4.2 | M | |

Comments: Reserved bit shall be set to zero

TABLE A.289

Trigger TLV

| Item | Capability | Reference | Status | Support |
|---|---|---|---|---|
| 1 | Type/Function/Action | 4.3.2; [11] 11.4.1 | m | |
| 2 | Trigger Value | 4.3.2; [11] 11.4.1 | m | |
| 3 | Trigger Averaging Duration | 4.3.2; [11] 11.4.1 | m | |

Comments:

TABLE A.290

Type/Function/Action Description

| Item | Capability | Reference | Status | Support |
|---|---|---|---|---|
| 1 | Type | [1] 11.4.1 | m | |
| 2 | Function | [1] 11.4.1 | m | |
| 3 | Action | [1] 11.4.1 | m | |

Comments:

This is an illustration of a set of Profile, in which the 'm' in the Status domain means it must be supported. And in future, according to the demand, the phase three, wave 3, requirement based on System Profile Version 1.0.0 may be defined.

The attributes that must be supported by this type of physical channels are referred to as physical channel basic attributes. For such an agreed set of Profile, a unique identifier (such as a number) can be appointed, and the base station sends the identifier of the Profile in a specific domain of a message, and the terminals can be aware of the physical channel basic attributes supported by the base station. Compared with transmitting each basic attribute information one by one in the prior art, obviously, a lot of resources can be saved.

On the basis of the basic attributes, a physical channel may further have enhanced attributes which are referred to as physical channel optional attributes, and the terminals should also be notified of these optional attributes. Since the number of these optional attributes is relatively small, for each possible result of selecting the optional attributes, i.e., each combination of the optional attribute parameters (an attribute parameter is the parameter used to represent the corresponding attribute) supported by the base station, a respective identifier (such as a number) can also be appointed and written into a specific domain of a message to be sent, and the terminals can be aware of the physical channel optional attributes supported by the base station according to the identifier. Of course, if there are not many optional attributes, the types of these optional attribute parameters can be identified one by one in the message.

Furthermore, besides the physical channel attributes supported by the base station, values of the physical channel attribute parameters need to be indicated sometimes, and a default value can be appointed for each of the physical channel attribute (including basic and optional) parameter. When the actual value of a physical channel attribute parameter is not the default value, it is noted in a specific domain of a message, otherwise the actual values of these parameters are regarded as equal to the default values.

The present invention will be described in detail with combination of the accompanying drawing and embodiments.

The First Embodiment

Based on the above analysis, in the first embodiment of the present invention, the physical-layer channel attributes information in a MAC message is constructed as follows:

| Profile | Length | Option | Parameter Class | Value |
|---|---|---|---|---|
| 1 byte (can be extended to multiple bytes) | 1 byte (can be extended to multiple bytes) | 1 byte (can be extended to multiple bytes) | 1 byte (can be extended to multiple bytes) | According to the value of Parameter Class, variable length |

Wherein, domains of Profile, Length, Option and ParameterClass each is 1 byte by default. If 0xFF (or some another specific value) is set, it means that the next byte is the extended value of the attributes message domain, otherwise the domain has only one byte.

Wherein, the value of Profile, i.e. the value in Profile, corresponds to a set of physical channel basic attributes which must be supported, and it can be defined according to the version number of the above-mentioned System Profile or other international or national standards. In order to support the extensibility, if the first byte of Profile is 0xFF, it means that the next byte is the extended value of Profile, otherwise Profile has only one byte, and the next byte is the domain of Length. The meaning of the value of Profile should be pre-defined.

The value of Length means the length of all the content included after the Profile, in units of bytes. In order to support the extensibility, if the first byte of Length is 0xFF, it means that the next byte is the extended value of Length, otherwise Length has only one byte, and the next byte is the domain of Option.

The value of Option corresponds to a combination of the added physical channel optional attributes. The introduction of the Option domain can flexibly extend the capability of the base station on the one hand, and on the other hand, improves the performance of the base station. If there is no new attribute added, this domain can be directly represented by 0x00. In order to support the extensibility, if the first byte of Option is 0xFF, it means that the next byte is the extended field of Option, otherwise the Option domain has only one byte, and the next byte is the domain of ParameterClass. The meaning of the value of Option should be pre-defined.

The two domains of ParameterClass and Value appear simultaneously and take effect in an attributes set represented by above-mentioned Profile and Option. These two domains indicate which attribute parameters in the attributes set have values different from the default ones and what the actual values are. This means these two domains are optional, and they are not needed when values of all the attribute parameters are the same as the default ones. Wherein, the ParameterClass can be directly represented by the value of the type of an attribute parameter in the standard, followed by the actual value of this type of attribute parameter, and if the actual values of multiple attribute parameters are different from the default values, they can be represented by multiple sets of ParameterClass and Value. In an alternative method, the value of ParameterClass is used to represent a combination of multiple attribute parameters whose actual values are different from the default ones, while Value is used to represent these actual values. Of course, multiple sets of ParameterClass and Value may be used, one of which is used to represent the attribute parameters in the compulsory attributes, whose actual values are different from the default ones, and the actual values thereof, and the other set is used to represent the attribute parameters in the optional attributes, whose actual values are different from the default ones, and the actual values thereof, or other grouping methods may be used. The attributes of the base station can be flexibly set through defining the types of combinations and giving the actual values in advance.

In this embodiment, the relationships among these five domains are as follows:

That is to say, on the basis of each set of Profile, a set of optional attributes combination may be included, represented by the value of Option (0 may be used to represent the case that there is no optional attribute). Furthermore, in the scope of Profile and Option domains, one or more sets of ParameterClass and Value are used to provide a set of attribute parameters, whose actual values are different from the default ones, and the actual values thereof. Parameters associated to the Must are in front of the parameters associated to the Option. In the designated domains of Profile and Option, each ParameterClass corresponds to a type of an attribute parameters combination, and in the corresponding domain of Value, the byte length of each parameter and the order of the parameters are fixed.

The transmitting apparatuses (such as the base station, wireless relay stations) store the mapping relationship between the value of each domain in the channel attributes information structure in the physical layer and the corresponding attribute, and the receiving apparatuses (such as terminals, wireless relay stations) store the mapping relationship between the value of each domain in the channel attributes information structure in the physical layer and the corresponding attribute, or store the information whether the attribute corresponding to the value of each domain is supported.

How the transmitting apparatuses and receiving apparatuses use this structure to construct, send and parse the physical-layer channel description information in all kinds of cases will be described in detail below.

Figure 1:
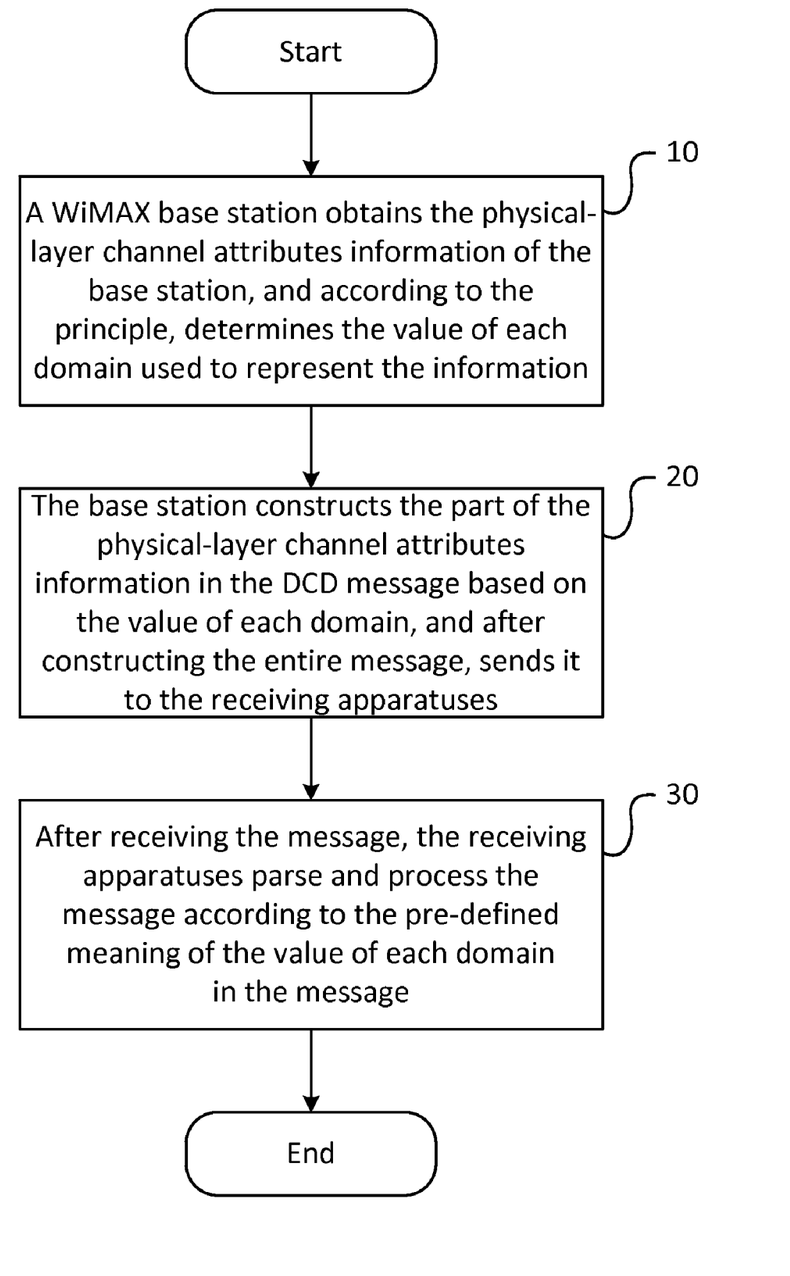
FIG. 1 is the flow chart of the method in accordance with the embodiments of the present invention.

Take MAC DCD message for example, and other messages are similar. As shown in FIG. 1, the method comprises the following steps:

Step 10, a WiMAX base station acquires the physical-layer channel attributes information of the base station and according to the above principles, determines the value of each domain used to represent the information;

1) The Value of Profile Domain

It is mentioned before that WiMAX Forum defined the compulsory content of the System Profile Version 1.0.0, the corresponding PICS Version 1.0.0 and phase two, wave 2, requirement. The value of this set of Profile is defined as Profile=0x01. And in future the phase three, wave 3, requirement based on System Profile 1.0.0 may be defined according to the demand, and it may be defined as Profile=0x02, and so forth.

If the version of SystemProfile changes, the new System Profile version as well as the corresponding different compulsory items, such as wave 1 of System Profile 1.0.1, can be continuously defined as a new Profile: 0x04, and so forth.

From the above it can be seen that according to the properties of WiMAX, the principle of defining Profile relates to the version of System Profile and the change of the compulsory content. If either one changes, a new Profile should be defined. That is, if a set of corresponding physical channel basic attributes is different, a different Profile value should be used.

2) The Value of Option Domain

Take Profile=0x01 for example, FBSS and HARQ are optionally supported in SystemProfile v1.0.0. Then if the base station knows that it has the capability of FBSS based on the capability information acquired from the network side, according to the definition in IEEE802.16e, three information fields of H_Add Threshold, H_Delete Threshold and ASR need to be added in the DCD message.

Through the Option domain, we may define the Option value corresponding to this set of optional attribute parameters combination as Option=0x01, which indicates that the base station only supports FBSS. Likewise, if just HARQ is supported, the Option value corresponding to this set of optional attribute parameters combination may be defined as Option=0x02, indicating that the base station only supports HARQ. If both optional attributes are supported, it is defined as 0x03. And if the capability information acquired by the base station does not comprise any content of optional item, i.e., neither FBSS nor HARQ is supported, the base station may set the Option domain to 0x00, indicating that any optional item is not supported. If there is a new optional item needing to be supported by DCD message according to a new version of SystemProfile, the Option value corresponding to the new optional attribute parameters combination may be defined according to the above principles.

In another embodiment, if there is no content of optional item, this domain can be removed and the Length field before is set to 0x00.

3) The values of ParameterClass and corresponding Value domains

The next is how the base station constructs the values of the Parameter and corresponding Value in the scope of the above Profile and Option domains.

Four examples are given below:

In the first example, take Profile=0x01, Option=0x00 for example, the BSID information unit in DCD message belongs to the Profile domain and its default value is 0x000000000001, and according to the configuration of the base station, its actual value is 0x003200000000, and in addition, the default value of PagingGroupID is 0x0001, and according to the configuration, the PagingGroupID corresponding to the base station is 0x0102, thus a set of ParameterClass and Value is needed to help to provide their actual values. For instance, ParameterClass=0x0D may be used to indicate that the actual values of BSID and PagingGroupID will be provided sequentially from the next byte, and the Value following that is 8 bytes in total. The first 6 bytes represents the actual BSID value, such as 0x003200000000, and the next 2 bytes is the value of PagingGroupID, 0x0102. For other information units, default values are used. As shown in the following table:

ParameterClass=0x0D, and the Value is the following content (Hex):

| 0 | 1 | 2 | 3 | 4 | 5 | 6 | 7 | 8 |
|---|---|---|---|---|---|---|---|---|
| 0D | 00 | 32 | 00 | 00 | 00 | 00 | 01 | 02 |

In the second example, take Profile=0x01, Option=0x01 for example, if the base station finds out that values of BSID and PagingGroupID in compulsory items and values of three information fields of H_Add Threshold, H_Delete Threshold and ASR in optional items are all different from the default values according to the configuration, a set of ParameterClass and Value is also needed to help to provide their actual values. For instance, ParameterClass=0x12 is used to indicate that the actual values of BSID, PagingGroupID, H_Add Threshold, H_Delete Threshold and ASR will be provided sequentially from the next byte, and the Value following that is 11 bytes in total. The first 6 bytes represents the actual BSID value, such as 0x001200120001, the seventh and eighth bytes represents the PagingGroupID, such as 0x0055, and the ninth, tenth and eleventh byte respectively represent the three information fields of H_Add Threshold, H_Delete Threshold and ASR, such as 0x10, 0x09 and 0x23. As shown in the following table:

ParameterClass=0x12, and the Value is the following content (Hex):

| 0 | 1 | 2 | 3 | 4 | 5 | 6 | 7 | 8 | 9 | 10 | 11 |
|---|---|---|---|---|---|---|---|---|---|----|----|
| 12 | 00 | 12 | 00 | 12 | 00 | 01 | 00 | 55 | 10 | 09 | 23 |

In the third example, in a case identical to that in the second example, two sets of ParameterClass and Value may be used to represent it. For instance, still take Profile=0x01, Option=0x01 for example, if the base station finds out that values of the BSID and PagingGroupId in compulsory items and values of the three information fields of H_Add Threshold, H_Delete Threshold and ASR in optional items are all different from the default values, ParameterClass=0x0D and corresponding Value are utilized to define the actual values of BSID, PagingGroupID, and meanwhile, ParameterClass=0x0E and corresponding Value are utilized to define the actual H_Add Threshold, H_Delete Threshold and ASR, such as 0x10, 0x09 and 0x23. That is, two sets of ParameterClass+Value are used to describe the values of the information units used in practice. As shown in the following table:

| 0 | 1 | 2 | 3 | 4 | 5 | 6 | 7 | 8 |
|---|---|---|---|---|---|---|---|---|
| 0x0D | 0x00 | 0x 12 | 0x 00 | 0x 12 | 0x 00 | 0x 01 | 0x 00 | 0x 55 |
| 0x 0E | 0x 10 | 0x 09 | 0x 23 | | | | | |

In this case, more bytes will be occupied compared with the previous definition mode; however, it has greater flexibility for an added defined information units combination.

It should be noted that definitions for combinations in the ParameterClass are also pre-defined and need to be identified by both transmitting apparatuses and receiving apparatuses. Here, that different combinations are used to represent the same meaning is to indicate that the method defined in the present invention can be utilized for flexible combination and extension.

In the fourth example, if the base station knows that its physical-layer attribute parameters all apply the default values according to the configuration, there is no need of an update with Parameter+Value.

4) The Value of Length Domain

At last, the base station calculates the actual value of Length domain, which equals the number of bytes occupied by Option and ParameterClass+Value.

Step 20, the base station constructs the part of the physical-layer channel attributes information in the MAC DCD message based on the acquired value of each domain, and after further completes the construction of the entire message, sends it to the receiving apparatuses;

Structure of the physical-layer channel attributes information part in the message is constructed according to the mode of Profile+Length+Option+ParameterClass+Value, and other parts are constructed according to provisions in the protocol, and in this example, domains of MessageType, Reserve and ChangeCount need to be added, and the entire message is constructed as follows according to the above examples:

In the first example, in a case that SystemProfile 1.0.0 phase two, wave 2, is supported, there is no optional item, and BSID and PagingGroupID need to be updated, the entire DCD message transmitted in air is encoded as follows according to the method defined in the present invention:

| MessageType | Reserve | ChangeCount | Profile | Length | Option |
|---|---|---|---|---|---|
| 0x01 | 0x00 | 0x07 | 0x01 | 0x0A | 0x00 |
| ParameterClass ||||||
| [BSID] ||| [PagingGroupID] |||
| 0x0D | 0x00 | 0x32 | 0x00 0x 00 0x 00 0x 00 || 0x 01 | 0x 02 |

Only 15 bytes are occupied.

In the second example, SystemProfile 1.0.0 phase two, wave 2, is supported, the optional item of FBSS is also supported, and values of information segment units of BSID and PagingGroupID as well as H_Add Threshold, H_Delete Threshold and ASR need to be updated. Then in this case, the entire DCD message is encoded as follows according to the method defined in the present invention:

| MessageType | Reserve | ChangeCount | Profile | Length | Option |
|---|---|---|---|---|---|
| 0x01 | 0x00 | 0x08 | 0x01 | 0x0D | 0x01 |
| ParameterClass ||||||
| [BSID] |||| [PagingGroupID] ||
| 0x12 0x00 | 0x 12 | 0x 00 0x 12 | 0x 00 0x 01 | 0x 00 | 0x 55 |
| [H_Add Threshold] || [H_Delete Threshold] || [ASR] ||
| 0x10 || 0x09 || 0x23 ||

As such, only 18 bytes are occupied.

In the third example, two sets of ParameterClass+Value are used to fulfill the same meaning of the second example, in this case, the entire DCD message is encoded as follows according to the method defined in the present invention:

| MessageType | Reserve | ChangeCount | Profile | Length | Option |
|---|---|---|---|---|---|
| 0x01 | 0x00 | 0x0A | 0x01 | 0x0E | 0x01 |
| ParameterClass ||||||
| [BSID] |||| [PagingGroupID] ||
| 0x0D 0x00 | 0x 12 | 0x 00 | 0x 12 0x 00 | 0x 01 | 0x 00 0x 55 |
| [ParameterClass] | [H_Add Threshold] || [H_Delete Threshold] || [ASR] |
| 0x0E | 0x10 || 0x09 || 0x23 |

As such, only 19 bytes are occupied.

In the fourth example, SystemProfile 1.0.0 phase two, wave 2, is supported and the optional item of HARQ is also supported, both applying default values, then in this case, the entire DCD message is encoded as follows according to the method defined in the present invention:

| MessageType | Reserve | ChangeCount | Profile | Length | Option |
|---|---|---|---|---|---|
| 0x01 | 0x00 | 0x0B | 0x01 | 0x01 | 0x02 |

As such, only 6 bytes are occupied.

It can be seen that with the message construction method defined in this embodiment, in the limit case, the smallest number of bytes occupied is 6; and the largest number of bytes occupied is 41, i.e., if values of all the information units are different from the default ones, the number of bytes occupied is 41, while under the condition of the same information content, 72 bytes need to occupied with the MAC message construction method defined in the present standard. Under the condition of transmitting the same information content, the wireless resources occupied with the MAC method provided in the present invention is 8%~57% of those with the method defined in the present standard.

The attributes information of the base station received by the above base station can be acquired from the network side or can be configured through the network management system. The message is sent at the designated time specified in the protocol.

Step 30, after receiving the message, the receiving apparatuses parse and process the message according to the predefined meaning of the value of each domain in the message.

The receiving apparatuses may be mobile terminals or wireless relay stations. This embodiment presumes that the bases station can only support one Profile, and the concrete processing flow of the receiving apparatuses comprises the following steps:

Step 301, after receiving the MAC DCD message, the receiving apparatus first checks the ChangeCount domain, and if it is different from the previous record, the receiving apparatus starts to process the DCD/UCD message, and proceeds to the next step; otherwise, the processing is not performed, and the flow ends.

Step 302, first checks the value of the Profile domain to judge whether a set of corresponding physical channel basic attributes combination is supported, and if yes, proceeds to step 303, otherwise proceeds to step 306;

Step 303, checks the Option domain and obtains the value of Option, if a set of optional attribute parameters combination corresponding to this value is supported, records it, otherwise neglects it;

Step 304, based on the value of the Length domain, judges whether there are ParameterClass+Value domains following it, and if yes, proceeds to the next step, otherwise proceeds to step 306;

Step 305, the receiving apparatus continues to check the ParameterClass domain, and according to the definition beforehand, obtains the value of the corresponding Value domain, while if the definition of the ParameterClass domain cannot be identified, it is directly discarded;

Here, there may be multiple sets of ParameterClass+Value, and if this construction mode is applied, after processing a set, the receiving apparatus may return to step 304 and judges whether there is another set of ParameterClass+Value to be processed according to the value of the Length domain.

Step 306, the receiving apparatus checks whether effective Profile attributes information is obtained, and if yes, continues the subsequent access; otherwise, withdraws from the current network and re-searches a new network.

It should be noted that, after obtaining the values of Profile and Option domains, the receiving apparatus already has a set of corresponding default attribute values, and the obtained values of ParameterClass and Value domains are just an update based on that; which means if the ParameterClass domain doesn't exist, the default values are used.

When there is a change in the physical-layer attributes of the base station, the network side should notify the base station and sends content of the changed information unit to the base station. After receiving the content, the base station updates its physical-layer attributes and constructs an entire physical-layer attributes message according to the new content, and the construction method is as stated above. After the construction is completed, the message is sent to the receiving apparatuses in a designated time slot. The receiving apparatuses receive, parse, process and update the physical-layer attributes record according to the above method.

The Second Embodiment

In this embodiment, a base station can support multiple sets of physical channel attributes, i.e., support multiple types of Profile, and may be represented by multiple sets of Profile+Length+Option+ParameterClass+Value domains. While if a receiving apparatus does not support a set of physical channel attributes, it may neglect it and continue to parse and process domains related to the next Profile.

If the base station simultaneously supports multiple sets of Profile according to the configuration information, each set of physical-layer channel attributes information in the channel description message can be constructed with the method described in the first embodiment.

Still take the examples in the first embodiment for illustration, if multiple types, such as two types, of Profile are supported, for instance, the first set of Profile=0x01, the construction method is as described in the first embodiment. Next, the same method is used to construct the part of Profile=0x04 (there is no optional parameter and all the parameters apply default values) and the corresponding Length field is filled in. After that, they are regarded as a DCD message and transmitted to the receiving apparatuses through air interface. At that time, the entire DCD message is encoded as follows according to the method defined in the present invention:

| MessageType | Reserve | ChangeCount | Profile | Length | Option |
|---|---|---|---|---|---|
| 0x01 | 0x00 | 0x07 | 0x01 | 0x0A | 0x00 |
| ParameterClass ||||||
| [BSID] ||||| [PagingGroupID] |
| 0x0D | 0x00 0x 00 | 0x 32 0x 00 0x 00 0x 00 | | 0x 01 | 0x 02 |
| Profile || Length || Option ||
| 0x04 || 0x01 || 0x00 ||

In the present standard, since the construction of a MAC message occupies a lot of wireless resources, it is almost impossible to support two types of Profile simultaneously. The method for constructing a MAC message proposed in the present invention provides a possibility of further extending the capability of the base station and improving the performance of the base station.

The processing by the receiving apparatuses is slightly different since the base station may support multiple Profiles, and the processing comprises the following steps of 301'~307', wherein:

Steps 301'~305' are the same as steps 301~305 in the first embodiment, except that the proceeding to step 306 should be changed into proceeding to step 306' to firstly judge whether there are other Profiles in the message, and step 306' and 307' are as follows:

Step 306', the receiving apparatus judges whether there are other Profiles behind, and if yes, returns to step 301 to start to obtain new Profile attributes, otherwise, proceeds to the next step;

According to the definition in IEEE802.16, DCD is transmitted in DLMAP (Downlink Mapping), thus through the total length of the DCD message defined in DLMAP and the value of the Length domain, the receiving apparatus can judge whether there are other Profiles behind. Likewise, UCD is transmitted in ULMAP, through the total length of the UCD message defined in ULMAP (Uplink Mapping), whether there are other Profiles behind can be judged.

Step 307', the receiving apparatus checks whether effective Profile attributes information is obtained, and if yes, continues the subsequent access; otherwise, withdraws from the current network and re-searches a new network.

The Third Embodiment

This embodiment is used to demonstrate the construction, transmission and parsing of the MAC UCD (Uplink Channel Description) message. Wherein, the construction principle of the physical-layer channel attributes information is the same as that in the first embodiment.

Step 1, a WiMAX base station acquires the uplink channel attributes information of the base station, and according to the construction principle of the physical-layer channel attributes information, determines the value of each domain used to represent the information;

According to the definition in IEEE802.16e, the construction of the UCD message is as follows:

| Syntax | Size | Comments |
|---|---|---|
| UCD_Message_Format( ) { | | |
| Management Message Type = 0 | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded information for the overall channel | Variable length | TLV format |
| Begin PHY Specific Section { | | See applicable PHY chapters |
| for (i = 1; i <= n; i++) { | | |
| Uplink_Burst_Profile | Variable length | |
| } | | |
| } | | |
| } | | |

Wherein, the TLV Encoded information for the overall channel is defined as follows:

| Name | Type (1 byte) | Length | Value (Variable Length) |
|---|---|---|---|
| Uplink_Burst_Profile | 1 | | May appear more than once (see 7.1.2.3.3). The length is the number of bytes of all the objects, including the embedded TLV items. |
| Contention-based reservation timeout | 2 | 1 | Number of UL-MAPs received before contention-based reservation is attempted again for the same connection. |
| Frequency | 5 | 4 | Unlink center frequency (kHz) |
| HO_ranging_starta | 7 | 1 | Initial backoff window size for MS performing initial ranging during handoff process, expressed as a power of 2. Range: 0-15 (the highest order bits shall be unused and set to 0) |
| HO_ranging_enda | 8 | 1 | Final backoff window size for MS performing initial ranging during handoff process, expressed as a power of 2. Range: 0-15 (the highest order bits shall be unused and set to 0) |
| Initial ranging codes | 150 | 1 | Number of initial ranging CDMA codes. Possible values are 0-255. |
| Periodic ranging codes | 151 | 1 | Number of periodic ranging CDMA codes. Possible values are 0-255. |
| Bandwidth request codes | 152 | 1 | Number of bandwidth request codes. Possible values are 0-255. |
| Periodic ranging backoff start | 153 | 1 | Initial backoff window size for periodic ranging contention, expressed as a power of 2. Range: 0-15 (the highest order bits shall be unused and set to 0). |
| Periodic ranging backoff end | 154 | 1 | Final backoff window size for periodic ranging contention, expressed as a power of 2. Range: 0-15 (the highest order bits shall be unused and set to 0). |
| Start of ranging codes group | 155 | 1 | Indicates the starting number, S, of the group of codes used in this uplink. The default value is set to 0, if there is no stipulation. All the ranging codes used in this uplink shall be between S and ((S + O + N + M + L) mod 256). Where, N is the number of initial-ranging codes M is the number of periodic-ranging codes L is the number of bandwidth-request codes The range of values is $255 \geq \geq S$. |
| Permutation base | 156 | 1 | Determines the UL_PermBase parameter for the subcarrier permutation to be used on this uplink channel. UL_PermBase = 7LSBs of the permutation base. |
| UL allocated subchannels bitmap | 157 | 9 | This is a bitmap describing the physical subchannels allocated to the segment in the UL, when using the uplink PUSC permutation. The LSB of the first byte shall correspond to subchannel 0. For any bit that is not set, the corresponding subchannel shall not be used by the SS on that segment. |
| Optional permutation UL allocated subchannels bitmap | 158 | 13 | This is a bitmap describing the subchannels allocated to the segment in the UL, when using the uplink optional PUSC permutation. The LSB of the first byte shall correspond to subchannel 0. For any bit that is not set, the corresponding subchannel shall not be used by the SS on that segment. If this TLV doesn't exist, BS may allocate any subchannel to a SS. |

-continued

| Name | Type (1 byte) | Length | Value (Variable Length) |
|---|---|---|---|
| Band AMC Allocation Threshould | 159 | 1 | dB unit |
| Band AMC Release Threshold | 160 | 1 | dB unit |
| Band AMC Allocation Timer | 161 | 1 | Frame unit Minimum required number of frames to measure the average and standard deviation for the Band AMC trigger. |
| Band AMC Release Timer | 162 | 1 | Frame unit Minimum required number of frames to measure the average and standard deviation for the triggering from Band AMC to normal subchannel. |
| Band Status Reporting MAX Period | 163 | 1 | Frame unit Maximum period between two refreshing the Band CINR measurement by the unsolicited REP-RSP |
| Band AMC Retry Timer | 164 | 1 | Frame unit Backoff timer between consecutive mode transitions from normal subchannel to Band AMC when the previous request is failed |
| Safety Channel Allocation Threshold | | | dB unit |
| Safety Channel Release Threshold | 166 | 1 | dB unit |
| Safety Channel Allocation Timer | 167 | 1 | Frame unit |

Likewise, according to the requirement of WiMAX SystemProfile 1.0.0 wave2, requirement for the UCD message may roughly refer to the following table. This is a set of Profile, and may be defined as Profile=0x01. Wherein, the 'm' in the Status domain means it must be supported.

TABLE A.291

| | PDU: UCD | | |
|---|---|---|---|
| Item | Capability | Status | Support |
| 1 | Management Message type = 0 | m | |
| 2 | Configuration Change count | m | |
| 3 | Ranging backoff start | m | |
| 4 | Ranging backoff End | m | |
| 5 | Request backoff start | m | |
| 6 | Request backoff End | m | |

Comments

TABLE A.1

| | UCD TLV | | |
|---|---|---|---|
| Item | Capability | Status | Support |
| 1. | Frequency | m | |
| 2. | Contention-based Reservation Timeout | m | |
| 3. | Start of Ranging Codes Group | m | |
| 4. | Band AMC Allocation Threshold | m | |
| 5. | Band AMC Release Threshold | m | |
| 6. | Band AMC Allocation Timer | m | |
| 7. | Band AMC Release Timer | m | |
| 8. | Band Status Reporting Max Period | m | |
| 9. | Band AMC Retry Timer | m | |
| 10. | Normalized C/N Override-2 | m | |
| 11. | Use CQICH Indication Flag | m | |
| 12. | Handover Ranging Codes | m | |

TABLE A.1-continued

| | UCD TLV | | |
|---|---|---|---|
| Item | Capability | Status | Support |
| 13. | Initial Ranging Codes | m | |
| 14. | Initial Ranging interval | m | |
| 15. | Tx Power Report | m | |
| 16. | Normalized C/N for Channel Sounding | IO-BF | |
| 17. | Initial Ranging backoff start | m | |
| 18. | Initial Ranging backoff end | m | |
| 19. | Bandwidth request backoff start | m | |
| 20. | Bandwidth request backoff end | m | |
| 21. | Permutation Base | m | |
| 22. | UL allocated subchannels bitmap | m | |
| 23. | HARQ Ack Delay for DL burst | m | |
| 24. | UL AMC allocated physical bands bitmap | m | |
| 25. | Size of CQICH-ID field | m | |
| 26. | Band-AMC entry average CINR | m | |
| 27. | HO_ranging_start | m | |
| 28. | HO_ranging_end | m | |
| 29. | Periodic Ranging Codes | m | |
| 30. | Bandwidth Request Codes | m | |
| 31. | Periodic Ranging Backoff Start | m | |
| 32. | Periodic Ranging Backoff End | m | |
| 33. | CQICH Band AMC Transition Delay | m | |
| 34. | OFDMA Uplink_Burst_Profile | m | |
| 35. | Ranging Region | o | |
| 36. | FastFeedback Region | o | |
| 37. | HARQ AckRegion | o | |
| 38. | Sounding Region | o | |

Comments:

TABLE A.2

OFDMA Uplink_Burst_Profile

| Item | Capability | Status | Support |
|---|---|---|---|
| 1. | Type = 1 | m | |
| 2. | Length | m | |
| 3. | Reserved (See Note) | m | |
| 4. | UIUC | m | |
| 5. | FEC Code Type and Modulation Type | m | |

Comments: Reserved bit shall be set to zero

If the uplink channel attributes information acquired by the base station comprises no optional item to be supported, the Option domain is set to 0x00. And if there is an optional item to be supported, such as BeamForming, according to the definition in IEEE802.16e, the information unit of Normalized C/N for Channel Sounding in the definition of UCD message should be supported. The value of Option for supporting this optional item may be set as Option=0x01 in advance. If there are more optional items that can be supported by the uplink physical channel of the base station, it can be achieved by defining more Option values in advance.

Based on the Profile (0x01) and Option (0x01), the base station next judges whether the default values need to be updated based on the acquired uplink channel attributes information. And if the update is needed, the value is set according to the pre-defined ParameterClass, for instance, the base station finds that the value of Initial ranging codes is different from the default value, and the corresponding ParameterClass=0x96, then the ParameterClass domain is set to 0x96, and the next byte is the actually applied value of the Initial ranging codes, such as 0x23.

Step 2, the base station constructs the part of the physical-layer channel attributes information in the MAC UCD message based on the acquired value of each domain, and after further completes the construction of the entire message, sends it to the receiving apparatuses;

In this embodiment, the encoding format of the UCD message to be transmitted in air is as follows:

| MessageType | Reserve | ChangeCount | Profile | Length | Option |
|---|---|---|---|---|---|
| 0x00 | 0x00 | 0x07 | 0x01 | 0x03 | 0x01 |
| ParameterClass | | [Initial ranging codes] | | | |
| 0x96 | | 0x23 | | | |

Similar to the construction method illustrated in the above examples, if there are more Profiles, definitions of new Profiles and Options can be continuously added through the mode of Profile+Length+Option+ParameterClass+Value. The ParameterClass+Value here may not exist (means that default values are entirely applied), or may be one or more sets to carry the content of the updated information units.

Step 3, after receiving the message, the receiving apparatuses parse and process the message according to the pre-defined meaning of the value of each domain in the MAC UCD message.

Here, the flow of parsing and processing the UCD message is the same as that for DCD message in the first and second embodiments, except that values in the domains represent different meanings, and will not be repeated here.

In order to fulfill the above functions, an encoding module may be added in the existing IEEE802.16 base station, and a decoding module may be added in the receiving apparatus, to implement the construction and parsing of this type of messages.

To be extensible, if there are relay stations, the relay station performs the parsing with the same method during receiving. And the same type of messages sent by the relay station may be constructed with the same method and sent to the receiving apparatuses. That is, the base station working as the transmitting apparatus in each of the above embodiments can be replaced with a relay station to fulfill the same function.

With the method in the above embodiments of the present invention, when messages similar to these need to be transmitted in air, the air resources occupancy is greatly reduced, the flexibility of the base station is enhanced, the processing by the terminals and the base station is simplified and the performance of the entire system is improved.

The description above is merely illustrative embodiments of the present invention, and it should be known that they may have a plenty of variations, which are not regarded as departing from the spirit and scope of the illustrative embodiments of the present invention, and all such variations obvious to those skilled in art are included in the scope of the claims appended.

For instance, in another embodiment, in said physical-layer channel description message, each of the attribute parameters supported by the transmitting apparatus whose actual values are different from the default ones and the actual values thereof can be represented by the type and value of the attribute, and a domain of Length is added in front of the domain representing the types and values of these attribute, indicating the length of the domain representing the types and values of these attribute. For optional attributes, the type of each optional attribute may be written into the message and a Length domain is added in front of them.

As another instance, the position of the Length domain may be behind the Option domain, to indicate the length of the ParameterClass+Value domain. Or the mode, in which end marks are used to indicate the ending positions of all the domains, is not excluded.

As another instance, the Profile and Option in the above embodiments respectively correspond to the basic and optional attributes, and in other embodiments, numbering of the two may be mixed up, i.e., each possible combination of basic and optional attributes is represented by a value, which means that the domains of Profile and Option are combined into one domain, as long as the transmitting and receiving apparatuses can implement corresponding encoding and decoding.

INDUSTRIAL APPLICABILITY

It can be seen that the present invention provides an entirely new method for constructing the MAC layer messages as well as the method and flow for constructing and parsing the structure of this type of messages by the base station and terminals, so that the MAC layer messages are transmitted more reasonably and effectively, the wireless resources utilization rate is greatly reduced. Compared with the prior art, under the condition of transmitting the same information content, the wireless resources occupied with the MAC method provided in the present invention is 8%~57% of that with the method defined in the present standard. With the method of the present invention, when messages similar to these need to be transmitted in air, the air resources occupancy is greatly reduced, the flexibility of the base station is

What we claim is:

1. A method for improving transmission efficiency of physical layer attributes in a wireless communication system over a physical layer channel supporting attributes, the method comprising the steps of:
   (a) defining one or more sets of physical layer channel basic attributes which are the attributes that must be supported by the physical layer channel, and each set being respectively represented by a value of a domain of attributes, that is, a value of Profile; and
   (b) a transmitting apparatus sending a physical layer channel description message which is an uplink channel description message and/or downlink channel description message, wherein the value of Profile is included in the physical layer channel description message and used to represent the physical layer channel basic attributes supported by the apparatus, wherein the channel description message is configured for use by a receiving apparatus to acquire, based on the value of Profile within the channel description message, a set of physical layer channel basic attributes supported by the transmitting apparatus.

2. A method of claim 1, wherein,
said transmitting apparatus is a base station or wireless relay station, and said receiving apparatus is a mobile terminal or wireless relay station.

3. A method of claim 1, further comprising:
in step (a), a combination of optional attribute parameters of physical layer channel being defined, and each type of combination being represented by a value of a domain of options, that is, a value of Option;
in step (b), in said channel description message, the value of Option being used to represent the optional attribute parameters of physical layer channel supported by said transmitting apparatus;
in step (c), based on the value of Option, the receiving apparatus acquiring information of the optional attribute parameters of physical layer channel supported by the transmitting apparatus.

4. A method of claim 1, further comprising:
in step (a), default values of physical layer channel attribute parameters being defined;
in step (b), if actual values of the physical layer channel attribute parameters are the same as the default values, said transmitting apparatus no longer providing values of the channel attribute parameters in said channel description message;
in step (c), if the receiving apparatus does not find the values of the channel attribute parameters in said message, regarding the values of the channel attribute parameters as the default values.

5. A method of claim 4, further comprising:
in step (b), in said physical layer channel description message, each of the attribute parameters supported by said transmitting apparatus whose actual values are different from the default values and the actual values thereof being represented by a type and value of the attribute, and a domain of length being added in front of a domain representing types and values of these attributes, to indicate the length of the domain representing types and values of these attributes.

6. A method of claim 4, further comprising:
in step (a), a combination of physical layer channel attribute parameters whose actual values are different from the default values being defined, and each type of combination being represented by a value of a domain of parameter categories, that is, a value of ParameterClass;
in step (b), if there exist physical layer channel attribute parameters whose actual values are different from the default values, said transmitting apparatus using the value of ParameterClass to represent these physical layer channel attribute parameters in said channel description message, and behind the ParameterClass, the actual values of these physical layer channel attribute parameters being written into a domain of values, that is, Value, in a predetermined order;
in step (c), based on values of said ParameterClass and Value, the receiving apparatus acquiring the physical layer channel attribute parameters supported by said transmitting apparatus whose actual values are different from the default values and the actual values thereof.

7. A method of claim 6, further comprising:
in step (a), the basic attribute parameters and optional attribute parameters whose actual values are different from the default values being combined respectively, that is, two sets of ParameterClass and Value domains being used to respectively represent the basic attribute parameters and optional attribute parameters whose actual values are different from the default values.

8. A method of claim 6, further comprising:
in step (b), if some of the physical layer channel attribute parameters supported by said transmitting apparatus have actual values different from the default values, a structure of physical layer attributes information in said channel description message comprising the following domains:
a domain of attributes, Profile, used to represent physical layer channel basic attributes supported by the transmitting apparatus;
a domain of optional items, Option, used to represent physical-layer channel optional attributes supported by the transmitting apparatus;
a domain of parameter categories, ParameterClass, used to represent channel attribute parameters supported by the transmitting apparatus whose actual values are different from the default values;
a domain of values, Value, used to represent the actual values of the channel attribute parameters whose actual values are different from the default values; and
a domain of length, Length, located in front of the domain of parameter categories, ParameterClass, and the value of Length equaling the sum of the lengths of other physical layer channel attribute information domains behind the domain.

9. A method of claim 6, further comprising:
in step (b), if actual values of physical layer channel attribute parameters supported by said transmitting apparatus all equal the default values, a structure of physical layer channel attributes information in said channel description message comprising the following domains:
a domain of attributes, Profile, used to represent physical layer channel basic attributes supported by the transmitting apparatus;
a domain of optional items, Option, used to represent physical layer channel optional attributes supported by the transmitting apparatus; and
a domain of length, Length, located between Profile and Option or behind Option, and the value of Length equaling the sum of the lengths of other physical layer channel attribute information domains behind the domain.

10. A method of claim 8, further comprising:

in step (c), the receiving apparatus parsing the physical layer channel attributes information according to the following steps of:
(c1) the receiving apparatus checking the value of the domain of attributes, and judging whether a set of corresponding physical channel basic attributes is supported, and if yes, proceeding to step (c2), otherwise proceeding to step (c6);
(c2) checking the value of the domain of optional items, and if a set of optional attribute parameters combination corresponding to the value is supported, recording the value, otherwise neglecting the value;
(c3) based on the value of the domain of length, judging whether there are domains of parameter categories and values behind, and if yes, proceeding to the next step, otherwise proceeding to step (c5);
(c4) checking the domain of parameter categories, and according to a pre-definition, obtaining the value of corresponding domain of values, while if the definition of the domain of parameter categories cannot be identified, directly discarding the value;
(c5) the receiving apparatus continuing a subsequent access, and the method ending; and
(c6) the receiving apparatus exiting from current network and re-searching a new network.

11. A method of claim 10, further comprising:

if said transmitting apparatus supports multiple sets of physical layer channel basic attributes, said channel description message comprising structures of multiple sets of physical layer channel attributes information;

when the receiving apparatus parses the physical layer channel attributes information, in step (c6), the receiving apparatus first judging whether there is another set of physical layer channel attributes information behind based on message length information, and if yes, processing the information with the same method, otherwise exiting from current network.

12. A method of claim 3, wherein, said basic attributes of physical layer channel in step (a) and said optional attribute parameters of physical layer channel are specified in a same protocol version, and if the protocol version or content of compulsory items changes, a different value of Profile corresponding to a different sets of physical layer channel basic attributes is defined, and based on this, different values of Option are defined according to combinations of optional attribute parameters therein.

13. A method of claim 12, further comprising:

in step (a), based on compulsory content of System Profile Version 1.0.0, corresponding Protocol Implementation Conformance Statement Version 1.0.0 and phase two, wave 2, requirement, a set of physical layer channel basic attributes being defined, and corresponding value of Profile being set to 0x01; and/or based on compulsory content of System Profile Version 1.0.0, corresponding Protocol Implementation Conformance Statement Version 1.0.0 and phase three, wave 3, requirement, a set of physical layer channel basic attributes being defined, and corresponding value of Profile being set to 0x02.

14. A method of claim 6, further comprising:

in step (b), a structure of physical layer attributes information in said channel description message comprising sequentially: a domain of attributes, Profile, of 1 or 2 bytes, a domain of optional items, Option, of 1 or 2 bytes, a domain of length, Length, of 1 or 2 bytes, and if there exist attribute parameters whose actual values are different from the default values, the structure further comprising one or more sets of domain of parameter categories, ParameterClass, and domain of values, Value, with variable lengths;

or a structure of physical layer attributes information in said channel description message comprising sequentially: a domain of attributes, Profile, of 1 or 2 bytes, a domain of length, Length, of 1 or 2 bytes, a domain of optional items, Option, of 1 or 2 bytes, and if there exist attribute parameters whose actual values are different from the default values, the structure further comprising one or more sets of domain of parameter categories, ParameterClass, and domain of values, Value, with variable lengths.

15. A method of claim 1, further comprising:

said transmitting apparatus storing a mapping relationship between the value of each domain in said physical layer channel attributes information structure and the corresponding attribute, said receiving apparatus storing a mapping relationship between the value of each domain in said physical layer channel attributes information structure and the corresponding attribute, or storing the information whether the attribute corresponding to the value of each domain is supported.

16. A method for transmitting physical layer channel attributes information associated with a physical layer channel supporting attributes by a transmitting apparatus, the method comprising the steps of:

including the physical layer channel attributes information in a channel description message which is an uplink channel description message and/or downlink channel description message, configuring the physical layer channel attributes information in the channel description message according to a structure comprising the following domains:

a domain of attributes, Profile, used to represent physical layer channel basic attributes supported by a transmitting apparatus, wherein the physical layer channel basic attributes are the attributes that must be supported by the physical layer channel;

a domain of optional items, Option, used to represent physical layer channel optional attributes supported by the transmitting apparatus;

a domain of parameter categories, ParameterClass, used to represent channel attribute parameters supported by the transmitting apparatus whose actual values are different from default values;

a domain of values, Value, used to represent the actual values of the channel attribute parameters whose actual values are different from the default values;

and a domain of length, Length, located in front of the domain of parameter categories, ParameterClass, and the value of Length equaling the sum of the lengths of other physical layer channel attribute information domains behind the domain, and transmitting the message.

17. A method for transmitting physical layer channel attributes information associated with a physical layer channel supporting attributes by a transmitting apparatus, the method comprising the steps of:

of including the physical layer channel attributes information in a channel description message which is an uplink channel description message and/or downlink channel description message, configuring the physical layer channel attributes information in the channel description message according to a structure comprising the following domains:
- a domain of attributes, Profile, used to represent physical layer channel basic attributes supported by a transmitting apparatus, wherein the physical layer channel basic attributes are attributes that must be supported by a physical layer channel;
- a domain of optional items, Option, used to represent physical layer channel optional attributes supported by the transmitting apparatus; and
- a domain of length, Length, located between Profile and Option or behind Option, and the value of Length equaling the sum of the lengths of other physical layer channel attribute information domains behind the domain, and transmitting the message.

18. A method for transmitting physical layer channel attributes information by a transmitting apparatus, the method comprising the steps of:
- including the physical layer channel attributes information in a channel description message,
- configuring the physical layer channel attributes information in the channel description message according to a structure comprising sequentially the following domains:
  - a domain of attributes, Profile, of 1 or 2 bytes, a domain of optional items, Option, of 1 or 2 bytes, a domain of length, Length, of 1 or 2 bytes, and if there exist attribute parameters whose actual values are different from default values, the structure further comprising one or more sets of domain of parameter categories, ParameterClass, and domain of values, Value, with variable lengths, or
- configuring the physical layer channel attributes information in the channel description message according to a structure comprising sequentially:
  - a domain of attributes, Profile, of 1 or 2 bytes, a domain of length, Length, of 1 or 2 bytes, a domain of optional items, Option, of 1 or 2 bytes, and if there exist attribute parameters whose actual values are different from default values, the structure further comprising one or more sets of domain of parameter categories, ParameterClass, and domain of values, Value, with variable lengths, and
- transmitting the message.

19. A method of claim 3, further comprising:
- in step (a), default values of physical layer channel attribute parameters being defined;
- in step (b), if actual values of the physical layer channel attribute parameters are the same as the default values, said transmitting apparatus no longer providing values of the channel attribute parameters in said channel description message;
- in step (c), if the receiving apparatus does not find the values of the channel attribute parameters in said message, regarding the values of the channel attribute parameters as the default values.

20. A method of claim 9, further comprising:
- in step (c), the receiving apparatus parsing the physical layer channel attributes information according to the following steps of:
- (c1) the receiving apparatus checking the value of the domain of attributes, and judging whether a set of corresponding physical channel basic attributes is supported, and if yes, proceeding to step (c2), otherwise proceeding to step (c6);
- (c2) checking the value of the domain of optional items, and if a set of optional attribute parameters combination corresponding to the value is supported, recording the value, otherwise neglecting the value;
- (c3) based on the value of the domain of length, judging whether there are domains of parameter categories and values behind, and if yes, proceeding to the next step, otherwise proceeding to step (c5);
- (c4) checking the domain of parameter categories, and according to a pre-definition, obtaining the value of corresponding domain of values, while if the definition of the domain of parameter categories cannot be identified, directly discarding the value;
- (c5) the receiving apparatus continuing a subsequent access, and the method ending; and
- (c6) the receiving apparatus exiting from current network and re-searching a new network.

21. A method of claim 3, further comprising:
- said transmitting apparatus storing a mapping relationship between the value of each domain in said physical layer channel attributes information structure and the corresponding attribute, said receiving apparatus storing a mapping relationship between the value of each domain in said physical layer channel attributes information structure and the corresponding attribute, or storing the information whether the attribute corresponding to the value of each domain is supported.

22. A method of claim 6, further comprising:
- said transmitting apparatus storing a mapping relationship between the value of each domain in said physical layer channel attributes information structure and the corresponding attribute, said receiving apparatus storing a mapping relationship between the value of each domain in said physical layer channel attributes information structure and the corresponding attribute, or storing the information whether the attribute corresponding to the value of each domain is supported.

* * * * *